(12) United States Patent
Jensen et al.

(10) Patent No.: US 11,045,798 B2
(45) Date of Patent: Jun. 29, 2021

(54) COATED WOOD PRODUCTS AND METHOD OF PRODUCING COATED WOOD PRODUCTS

(75) Inventors: Henrik Jensen, Ølstykke (DK); Theis Reenberg, Copenhagen (DK)

(73) Assignee: VALINGE PHOTOCATALYTIC AB, Viken (SE)

(*) Notice: Subject to any disclaimer, the term of this patent is extended or adjusted under 35 U.S.C. 154(b) by 110 days.

(21) Appl. No.: 13/529,254

(22) Filed: Jun. 21, 2012

(65) Prior Publication Data

US 2013/0011684 A1 Jan. 10, 2013

Related U.S. Application Data

(60) Provisional application No. 61/504,558, filed on Jul. 5, 2011.

(51) Int. Cl.
| | |
|---|---|
| *B44C 5/04* | (2006.01) |
| *B01J 35/00* | (2006.01) |
| *C09D 15/00* | (2006.01) |
| *B01J 21/06* | (2006.01) |
| *B01J 37/02* | (2006.01) |
| *C09D 7/40* | (2018.01) |

(52) U.S. Cl.
CPC ......... *B01J 35/006* (2013.01); *B01J 21/063* (2013.01); *B01J 35/004* (2013.01); *B01J 35/0013* (2013.01); *B01J 37/0244* (2013.01); *B44C 5/04* (2013.01); *C09D 7/67* (2018.01); *C09D 15/00* (2013.01); *B01J 35/0006* (2013.01); *Y10T 428/31663* (2015.04); *Y10T 428/31674* (2015.04); *Y10T 428/31989* (2015.04)

(58) Field of Classification Search
None
See application file for complete search history.

(56) References Cited

U.S. PATENT DOCUMENTS

| | | | |
|---|---|---|---|
| 3,798,111 A | 3/1974 | Lane et al. | |
| 3,932,342 A | 1/1976 | Nagata et al. | |
| 5,439,514 A | 8/1995 | Kashiwazaki et al. | |
| 5,679,138 A | 10/1997 | Bishop et al. | |
| 5,714,269 A * | 2/1998 | Munoz Madrid | 428/500 |
| 5,853,830 A | 12/1998 | McCaulley et al. | |
| 5,882,246 A | 3/1999 | Inkyo et al. | |
| 6,162,842 A * | 12/2000 | Freche | C09D 4/00 522/102 |
| 6,165,619 A * | 12/2000 | Ikenaga | B05D 7/546 427/387 |
| 6,228,480 B1 | 5/2001 | Kimura et al. | |

(Continued)

FOREIGN PATENT DOCUMENTS

| | | |
|---|---|---|
| BE | 1015862 A6 | 10/2005 |
| BE | 1017168 A5 | 3/2008 |

(Continued)

OTHER PUBLICATIONS

English machine translation of JP 2005281017 (EPO)(2005).*

(Continued)

*Primary Examiner* — Kenneth J Stachel
(74) *Attorney, Agent, or Firm* — Buchanan Ingersoll & Rooney P.C.

(57) ABSTRACT

A coated wood product, comprising a barrier layer and a photocatalytic layer and a method for producing such a coated wood product.

22 Claims, 3 Drawing Sheets

(56) References Cited

U.S. PATENT DOCUMENTS

| | | |
|---|---|---|
| 6,284,314 B1 | 9/2001 | Kato et al. |
| 6,299,981 B1 | 10/2001 | Azzopardi et al. |
| 6,409,821 B1 | 6/2002 | Cassar et al. |
| 6,436,159 B1 | 8/2002 | Safta et al. |
| 6,666,913 B2 | 12/2003 | Hirano et al. |
| 6,740,312 B2 | 5/2004 | Chopin et al. |
| 6,835,421 B1 | 12/2004 | Döhring |
| 6,905,814 B1 | 6/2005 | Aubay |
| 8,568,870 B2 | 10/2013 | Imai et al. |
| 8,652,646 B2 | 2/2014 | Heukelbach et al. |
| 9,375,750 B2 | 6/2016 | Reenberg et al. |
| 9,573,126 B2 | 2/2017 | Humle et al. |
| 2002/0005145 A1 | 1/2002 | Sherman |
| 2002/0006425 A1 | 1/2002 | Takaoka et al. |
| 2002/0042343 A1 | 4/2002 | Akui et al. |
| 2002/0108640 A1 | 8/2002 | Barger et al. |
| 2003/0162658 A1 | 8/2003 | Domen et al. |
| 2003/0207083 A1* | 11/2003 | Hansson .............. B32B 5/30 428/143 |
| 2003/0236317 A1 | 12/2003 | Sakatani et al. |
| 2004/0067703 A1 | 4/2004 | Grunden et al. |
| 2004/0081818 A1 | 4/2004 | Baumann et al. |
| 2004/0197682 A1 | 10/2004 | Sonehara et al. |
| 2004/0251329 A1 | 12/2004 | Hsu et al. |
| 2004/0253172 A1 | 12/2004 | Jung et al. |
| 2005/0069706 A1 | 3/2005 | Kessell |
| 2005/0145939 A1* | 7/2005 | Okada et al. .............. 257/347 |
| 2005/0191505 A1* | 9/2005 | Akarsu et al. ............. 428/469 |
| 2005/0233893 A1 | 10/2005 | Sakatani et al. |
| 2006/0003013 A1 | 1/2006 | Dobbs |
| 2006/0014050 A1 | 1/2006 | Gueneau et al. |
| 2006/0194886 A1 | 8/2006 | Adam et al. |
| 2007/0140951 A1 | 6/2007 | O'Brien |
| 2007/0190324 A1* | 8/2007 | Hayashi ............... A61K 8/29 428/402 |
| 2007/0272382 A1 | 11/2007 | Becker et al. |
| 2008/0032120 A1* | 2/2008 | Braun ................. B05D 7/06 428/334 |
| 2008/0044483 A1 | 2/2008 | Kessell |
| 2008/0260626 A1 | 10/2008 | Bloss et al. |
| 2009/0025508 A1 | 1/2009 | Liao et al. |
| 2009/0075093 A1 | 3/2009 | Iversen |
| 2009/0098305 A1 | 4/2009 | Cheng et al. |
| 2009/0136861 A1 | 5/2009 | Mitsumori et al. |
| 2009/0142604 A1 | 6/2009 | Imai et al. |
| 2009/0180976 A1 | 7/2009 | Seeney et al. |
| 2009/0191273 A1 | 7/2009 | Kessell et al. |
| 2009/0208646 A1 | 8/2009 | Kreuder et al. |
| 2009/0286068 A1 | 11/2009 | Niguma et al. |
| 2009/0317624 A1 | 12/2009 | Yoshioka et al. |
| 2010/0031450 A1 | 2/2010 | Wattebled et al. |
| 2010/0058954 A1 | 3/2010 | Kisch |
| 2010/0112359 A1 | 5/2010 | Sharma et al. |
| 2010/0113254 A1 | 5/2010 | Sato et al. |
| 2010/0203308 A1* | 8/2010 | Mennig et al. ............. 428/220 |
| 2010/0297434 A1 | 11/2010 | Iversen et al. |
| 2011/0027485 A1 | 2/2011 | Kahn et al. |
| 2011/0083726 A1 | 4/2011 | Takayanagi |
| 2011/0095242 A1 | 4/2011 | Jin et al. |
| 2011/0123814 A1 | 5/2011 | Heukelbach et al. |
| 2011/0136660 A1 | 6/2011 | Hiroshi et al. |
| 2011/0136928 A1* | 6/2011 | Dipietro ............... B82Y 10/00 521/98 |
| 2011/0189471 A1 | 8/2011 | Ziegler et al. |
| 2012/0064787 A1 | 3/2012 | Brummerstedt Iversen et al. |
| 2013/0008585 A1 | 1/2013 | Hasskerl et al. |
| 2013/0177504 A1 | 7/2013 | Macoviak |
| 2013/0216458 A1 | 8/2013 | Nagae et al. |
| 2014/0178694 A1 | 6/2014 | Reenberg et al. |
| 2015/0083319 A1 | 3/2015 | Persson et al. |
| 2015/0102258 A1 | 4/2015 | Humle et al. |
| 2015/0343486 A1 | 12/2015 | Jensen et al. |
| 2016/0075606 A1 | 3/2016 | Jensen et al. |
| 2017/0297056 A1 | 10/2017 | Ziegler et al. |

FOREIGN PATENT DOCUMENTS

| | | | |
|---|---|---|---|
| CN | 1445312 A | 10/2003 | |
| CN | 1662465 A | 8/2005 | |
| CN | 1762580 A | 4/2006 | |
| DE | 10 2004 032 058 A1 | 5/2005 | |
| DE | 10 2007 054 848 A1 | 5/2009 | |
| EP | 0 684 507 A2 | 11/1995 | |
| EP | 0 684 507 A3 | 11/1995 | |
| EP | 0 913 447 A1 | 5/1999 | |
| EP | 0 684 507 B1 | 9/1999 | |
| EP | 0 947 469 A2 | 10/1999 | |
| EP | 1 371 693 A2 | 12/2003 | |
| EP | 1 541 231 A1 | 6/2005 | |
| EP | 1 541 638 A1 | 6/2005 | |
| EP | 1 577 009 A1 | 9/2005 | |
| EP | 1 760 116 A1 | 3/2007 | |
| EP | 1 997 860 A1 | 12/2008 | |
| EP | 1 997 860 A4 | 12/2008 | |
| FR | 2 789 591 A1 | 8/2000 | |
| JP | 10235201 A * | 9/1998 | |
| JP | 2001-038858 A | 2/2001 | |
| JP | 2001-131768 A | 5/2001 | |
| JP | 2002-011827 A | 1/2002 | |
| JP | 2002-146283 A | 5/2002 | |
| JP | 2002177792 A * | 6/2002 | |
| JP | 2002-249705 A | 9/2002 | |
| JP | 2003/071967 A | 3/2003 | |
| JP | 2003-211576 A | 7/2003 | |
| JP | 2005281017 A * | 10/2005 | |
| JP | 2006142217 A * | 6/2006 | |
| JP | 2007-167718 A | 7/2007 | |
| JP | 2007-176753 A | 7/2007 | |
| JP | 2008/261093 A | 10/2008 | |
| JP | 2010-047016 A | 3/2010 | |
| JP | 2011-500896 A | 1/2011 | |
| WO | WO 96/39251 A1 | 12/1996 | |
| WO | WO 97/00134 A1 | 1/1997 | |
| WO | WO 97/30130 A1 | 8/1997 | |
| WO | WO 98/23549 A1 | 6/1998 | |
| WO | WO 98/25711 A1 | 6/1998 | |
| WO | WO 00/44984 A1 | 8/2000 | |
| WO | WO 02/08518 A1 | 1/2002 | |
| WO | WO 02/064266 A2 | 8/2002 | |
| WO | WO 03/016219 A1 | 2/2003 | |
| WO | WO 03/087002 A1 | 10/2003 | |
| WO | WO 2004/005577 A2 | 1/2004 | |
| WO | WO 2004/069400 A1 | 8/2004 | |
| WO | WO 2005/045131 A1 | 5/2005 | |
| WO | WO 2005/066286 A1 | 7/2005 | |
| WO | WO 2005/068181 A1 | 7/2005 | |
| WO | WO 2005/116361 A1 | 12/2005 | |
| WO | WO 2006/136931 A1 | 12/2006 | |
| WO | WO 2007/015669 A2 | 2/2007 | |
| WO | WO 2007/015669 A3 | 2/2007 | |
| WO | WO 2007/069596 A1 | 6/2007 | |
| WO | WO 2007/072008 A2 | 6/2007 | |
| WO | WO 2007/097284 A1 | 8/2007 | |
| WO | WO 2007/135987 A1 | 11/2007 | |
| WO | WO 2007/144718 A2 | 12/2007 | |
| WO | WO 2007/144718 A3 | 12/2007 | |
| WO | WO 2008/040730 A1 | 4/2008 | |
| WO | WO 2008/117655 A1 | 10/2008 | |
| WO | WO 2008/128818 A1 | 10/2008 | |
| WO | WO-2008133370 A1 * | 11/2008 | ........... C08G 18/324 |
| WO | WO 2009/021524 A1 | 2/2009 | |
| WO | WO 2009/024285 A1 | 2/2009 | |
| WO | WO 2009/049000 A1 | 4/2009 | |
| WO | WO 2009/062516 A2 | 5/2009 | |
| WO | WO 2009/062516 A3 | 5/2009 | |
| WO | WO 2009/065769 A2 | 5/2009 | |
| WO | WO 2009/065769 A3 | 5/2009 | |
| WO | WO 2009/124704 A1 | 10/2009 | |
| WO | WO 2009/145209 A1 | 12/2009 | |
| WO | WO 2009/157449 A1 | 12/2009 | |
| WO | WO 2010/001669 A1 | 1/2010 | |
| WO | WO 2010037866 A1 * | 4/2010 | ............. C08L 33/00 |
| WO | WO 2010/110726 A1 | 9/2010 | |
| WO | WO 2011075837 A1 * | 6/2011 | ............. C08F 251/02 |

(56) References Cited

FOREIGN PATENT DOCUMENTS

| WO | WO 2011/093785 A1 | 8/2011 |
|---|---|---|
| WO | WO 2011/113692 A1 | 9/2011 |
| WO | WO 2012/014893 A1 | 2/2012 |
| WO | WO 2013/006125 A1 | 1/2013 |
| WO | WO 2013/141789 A1 | 9/2013 |

OTHER PUBLICATIONS

English machine translation of JP 2002177792 (JPO)(2002).*
Hawley's Condensed Chemical Dictionary fumed silica definition (2007).*
JPO English machine translation of JP10-235201 (1998).*
English machine translation of JP-2006142217-A (2006).*
English machine translation JP 2001038858 from JPO (2001).*
Wu, Shu-Xin, et al., "XPS Study of Copper Doping TiO2 Photocatalyst," Acta. Phys.—Chim. Sin., Oct. 2003, pp. 967-969, vol. 19(10), CN.
International Search Report issued in PCT/SE2012/050703, dated Oct. 19, 2012, 5 pages, ISA/SE, Stockholm, SE.
Written Opinion issued in PCT/SE2012/050703, dated Oct. 19, 2012, 6 pages, ISA/SE, Stockholm, SE.
Reenberg, Theis, et al., U.S. Appl. No. 13/725,000 entitled "Method for Coating a Building Panel and a Building Panel," filed Dec. 21, 2012.
Jang, Hee Dong, et al., "Effect of particle size and phase composition of titanium dioxide nanoparticles on the photocatalytic properties," Journal of Nanoparticle Research, Jan. 1, 2001, pp. 141-147, vol. 3, Kluwer Academic Publishers, NL.
Caseri, Walter, "Nanocomposites of polymers and metals or semiconductors: Historical background and optical properties," Macromol. Rapid Commun., Jan. 1, 2000, pp. 705-722, vol. 21, No. 11, Wiley-VCH Verlag GmbH, Weinheim, DE.
Mandzy, N., et al., "Breakage of $TiO_2$ agglomerates in electrostatically stabilized aqueous dispersions," Powder Technology, Dec. 6, 2005, pp. 121-126, vol. 160, No. 2, Elsevier Sequoia, Lausanne, CH.
Humle, Michael, et al., U.S. Appl. No. 14/386,063, entitled "A Photocatalytic Composition," filed in the U.S. Patent and Trademark Office on Sep. 18, 2014.
Persson, Hans, et al., U.S. Appl. No. 14/494,957, entitled "Method of Applying a Photocatalytic Dispersion," filed in the U.S. Patent and Trademark Office on Sep. 24, 2014.
Arin, Melis, et al., "Inkjet printing of photocatalytically active $TiO_2$ thin films from water based precursor solutions," 28 pages; also found in Journal of the European Ceramic Society, Jun. 2011, pp. 1067-1074, vol. 31, Issue 6, Science Direct, Elsevier B.V. (Rev. Dec. 10, 2010, Acc Dec. 21, 2010).
Kim, Seong-Jim, et al., "Aqueous $TiO_2$ suspension preparation and novel application of ink-jet printing technique for ceramics patterning," Journal of Materials Science Letters, 1998, pp. 141-144, vol. 17, Chapman & Hall, London, England.
Kuscer, Danjela, et al., "Formulation of an Aqueous Titania Suspension and its Patterning with Ink-Jet Printing Technology," J Am Ceram Soc., 2012, pp. 487-493, vol. 95, No. 2, Blackwell Publishing Inc on behalf of The American Ceramic Society, USA.
Raimondo, Mariarosa, et al., Photocatalytic Ceramic Tiles: Key Factors in Industrial Scale-Up (and the Open Question of Performance), Qualicer 2012, pp. 1-14, Castellón, Spain.
Schmidt, Helmut K., et al., "Application of spray techniques for new photocatalytic gradient coatings on plastics," Thin solid films, Apr. 28, 2006, vol. 502, Issues 1-2, pp. 132-137, Elsevier B.V., NL.
Thilagan Palaniandy, Samayamutthirian, "A Study on Ultra Fine Grinding of Silica and Talc in Opposed Fluidized Bed Jet Mill," PhD Thesis, 2008, 48 pages, Universiti Sains Malaysia, http://eprints.usm.my/view/creators/Thilagan_Palaniandy=3ASamayamutthirian=3A=3A.html.
U.S. Appl. No. 14/654,203, Henrik Jensen, Theis Reenberg and Göran Ziegler, filed Jun. 19, 2015 (Cited herein as US Patent Application Publication No. 2015/0343486 A1 of Dec. 3, 2015).
Extended European Search Report issued in EP 12 80 7782, dated Jun. 8, 2015, 21 pages.
Ziegler, Göran, et al., U.S. Appl. No. 15/394,874 entitled "Method for Applying Nanoparticles," filed Dec. 30, 2016.
Communication pursuant to Article 94(3) EPC dated Mar. 8, 2018 in EP Application No. 12 807 782.3, European Patent Office, Munich, DE, 6 pages.
Ingkyo, Mitsugi, et al., "Beads Mill-Assisted Synthesis of Poly Methyl Methacrylate (PMMA)-$TiO_2$ Nanoparticle Composites," Ind. Eng. Chem. Res., 2008, pp. 2597-2604, vol. 47, No. 8, American Chemical Society, USA (published on the web Mar. 14, 2008).
Ingkyo, Mitsugi, et al., "Experimental investigation of nanoparticle dispersion by beads milling with centrifugal bead separation," Journal of Colloid and Interface Science, 2006, pp. 535-540, vol. 304, Elsevier Inc., USA.
Joni, I Made, et al., "Dispersion Stability Enhancement of Titania Nanoparticles in Organic Solvent Using a Bead Mill Process," Ind. Eng. Chem. Res., 2009, pp. 6916-6922, vol. 48, No. 15, American Chemical Society, USA (published on the web Jul. 13, 2009).
Takeda, Masayoshi, et al., "High-concentration Transparent $TiO_2$ Nanocomposite Films Prepared from $TiO_2$ Nanoslurry Dispersed by Using Bead Mill," Polymer Journal, 2008, pp. 694-699, vol. 40, No. 8, The Society of Polymer Science, JP.
Takeda, Masayoshi, et al., "Preparation of Nanocomposite Microspheres Containing High Concentration of $TiO_2$ Nanoparticles via Bead Mill Dispersion in Organic Solvent," Chemistry Letters, 2009, pp. 448-449, vol. 38, No. 5, The Chemical Society of Japan, JP.
Thompson, Tracy L., et al., "Surface Science Studies of the Photoactivation of $TiO_2$-New Photochemical Processes," Chem. Rev., 2006, pp. 4428-4453, vol. 106, No. 10, American Chemical Society, USA (published on the web Oct. 11, 2006).
Uzunova-Bujnova, M., et al., "Effect of the mechanoactivation on the structure, sorption and photocatalytic properties of titanium dioxide," Materials Chemistry and Physics, 2008, pp. 291-298, vol. 110, Elsevier B.V., The Netherlands.
Parker, John, "Next-generation abrasive particles for CMP", Solid Technology, Dec. 2004, pp. 30-31.
Jensen, Henrik, et al, "Characterization of nanosized partly crystalline photocatalysts", Journal of Nanoparticle Research 6, 2004, pp. 519-526.
"Information Sheet—Cleaning and maintenance of laminate flooring in commercial areas created on behalf of the EPLF," Sep. 22, 1999, 5 pages, European Producers of Laminate Flooring, Bielefeld, DE.
Mills, A., et al., "An intelligence ink for photocatalytic films," Chem. Commun., published as an Advance Article on the web Apr. 14, 2005, pp. 2721-2723, The Royal Society of Chemistry, www.rsc.org.chemcomm.
Communication Pursuant to Article 94(3) EPC (EPO Form 2001 12.10CSX and EPO Form 2906 01.91 TRI) issued in EP 08 848 938.0, dated Oct. 20, 2011, 7 pages, European Patent Office, Munich, DE.
Nussbaumer, René J., et al., "Synthesis and characterization of surface-modified rutile nanoparticles and transparent polymer composites thereof," Journal of Nanoparticle Research, Aug. 1, 2002, pp. 319-323, vol. 4, No. 4, Kluwer Academic Publishers, NL.
"Transparent Pigments," Kirk-Othmer Encyclopedia of Chemical Technology, Fourth Edition, 1996, vol. 19, pp. 36-37, John Wiley & Sons, Inc., NY, US.

* cited by examiner

COATED WOOD PRODUCTS AND METHOD OF PRODUCING COATED WOOD PRODUCTS

CROSS-REFERENCE TO RELATED APPLICATIONS

The present application claims the benefit of US. Provisional Application No. 61/504,558, filed on 5 Jul. 2011, and Swedish Application No. 1150636-7, filed on 5 Jul. 2011. The entire contents of each of U.S. Provisional Application No. 61/504,558, and Swedish Application No. 1150636-7 are hereby incorporated herein by reference in their entirety.

TECHNICAL FIELD

The disclosure generally relates to the field of wood products, e.g. building panels, such as floor panels, with a surface of wood. The disclosure more particularly relates to a building panel with coated surface of wood.

BACKGROUND

For a lacquered solid wood floor the visual appearance is very important. Furthermore, due to new regulations it is important to introduce properties that can reduce the level of indoor volatile organic compounds (VOC's).

It is well known that building materials can obtain photocatalytic properties. U.S. Pat. No. 6,409,821 describes how to apply $TiO_2$ to external cement building materials by mixing micron sized $TiO_2$ in the bulk cement mixture. Furthermore, it was shown in WO 2009/062516 that it is possible to apply nanoparticles on a laminate surface or on an overlay paper and introduce photocatalytic properties to internal surfaces.

US 2010/0058954 describes a carbon-modified titanium dioxide film arranged on a substrate such as glass, metal, plastic or titanium dioxide film. A barrier layer may be arranged to prevent potential diffusion of sodium and other ions from the substrate into the carbon-modified titanium dioxide film. The photocatalytic activity can be inhibited by diffusion of sodium and other ions from the substrate.

OBJECTS OF THE INVENTION

An objective of at least certain embodiments of the present invention is to provide a lacquered or varnished board or panel such as a lacquered solid wood flooring having improved washing properties thereby providing an overall cleaner looking floor.

An objective of at least certain embodiments of the present invention is to provide a lacquered or varnished board or panel such as a lacquered solid wood flooring having improved VOC removing properties thereby providing an overall better indoor environment.

Still another objective of at least certain embodiments is to provide a photocatalytic lacquered or varnished board or panel having an improved antimicrobial effect and/or an improved deodorizing effect and/or an improved degradation of VOC effect and/or anti stain properties of said lacquered or varnished board or panel.

Another objective of at least certain embodiments is to provide a lacquered board or panel having improved wash properties and/or VOC effect obtained by a transparent photocatalytic coating composition.

A further objective of at least certain embodiments is to provide a lacquered board or panel having improved wash properties and/or VOC effect and wherein these properties are durable and maintained under use conditions.

A still further objective of at least certain embodiments is to provide photocatalytic nanoparticle compositions suitable for functionalization of lacquered boards or panels. Said formulations may provide said functions more effectively and/or allow for use of less material and/or be more durable and/or be cheaper and/or allow for easier processing and/or processing at lower temperatures and/or allow for use under other illumination conditions than hitherto.

A still further objective of at least certain embodiments is to provide a transparent active photocatalytic composition on lacquered boards or panels with minimal impact on the underlying lacquer or varnish.

A still further objective of at least certain embodiments is to provide a transparent active photocatalytic composition on lacquered boards or panels with minimal impact on the underlying lacquer or varnish but still being active enough to provide improved VOC properties and/or washing properties at indoor light conditions.

A still further objective of at least certain embodiments is to provide transparent coating compositions to lacquered boards or panels without impacting the visual appearance of said lacquered boards or panels.

A still further objective of at least certain embodiments may be to provide transparent coating compositions to lacquered boards or panels without impacting the mechanical properties of said lacquered boards or panels.

A still further objective of at least certain embodiments is to provide water borne coating compositions to lacquered boards or panels maintaining the visual and mechanical properties of said lacquered boards or panels.

Furthermore, it can be an objective of at least certain embodiments of the present invention to provide a method for producing such photocatalytic lacquered boards or panels.

SUMMARY OF THE INVENTION

The present invention presents a method of introducing visible light sensitive and/or UV sensitive photocatalytic particles into lacquered boards or panels without damaging the underlying lacquer still maintaining a product capable of VOC reduction of indoor air. The present invention may comprise the step of spraying a photocatalytic coating composition into the top lacquer and drying and/or curing said photocatalytic composition. The present invention relates to a method of introducing said photocatalytic coating composition without altering the visual and mechanical properties of said lacquered boards or panels.

Furthermore, the present invention relates to a photocatalytic lacquered board or panel comprising a barrier layer, preferably transparent, and a photocatalytic composition layer, preferably transparent. The present product maintains the appearance and mechanical properties of the lacquered board or panel but also obtains a photocatalytic VOC reducing property.

A first aspect of the invention is a building panel comprising a surface of wood provided with a base coat, e.g. lacquer layer, and a topcoat, comprising barrier particles and photocatalytic nanoparticles. Preferably the barrier particles are embedded and substantially homogenously distributed in said topcoat. Preferably the photocatalytic nanoparticles are embedded and substantially homogenously distributed in said topcoat. In an alternative embodiment, the topcoat may also comprise a first layer, a barrier layer comprising said barrier particles, and a second layer of photocatalytic nanoparticles. Preferably the barrier particles are embedded and substantially homogenously distributed in said barrier layer. Preferably the photocatalytic nanoparticles are embedded and substantially homogenously distributed in said second layer. Between the first and the second layers there may be an area of mixed barrier and photocatalytic nanoparticles.

The topcoat may be transparent. The base coat may be at least one lacquer layer. The base coat may comprise more than one lacquer layer.

The barrier particles may be adapted to protect the base coat from the photocatalytic activity of the photocatalytic nanoparticles.

The barrier layer preferably comprises a silicium containing compound such as $SiO_2$, colloidal $SiO_2$, functional nanoscaled $SiO_2$, silicone resin, organofunctional silanes, and/or colloidal silicic acid silane and/or a combination of said compounds.

The building panel, e.g. a floor panel, with the surface of wood may be a solid wood product, a panel for a parquet floor or engineered floor, a plywood or an HDF or MDF board provided with veneer or linoleum. Linoleum comprises wood material in form of wood flour or sawdust or cork.

A second coat may also be provided above the base coat and under the topcoat.

A layer may be arranged between the surface of wood and the base coat. Such a layer may be a print, a print layer or paint.

The inventive building panel can be provided with considerably improved washing properties. Specifically, when washing such a board or panel, water drops are spreading on the surface in such a manner that dirt is easier to suspend and remove without excessive use of special cleaning agents and harsh chemicals. The building panel thereby shows hydrophilic properties. Further drying is significantly faster and more uniform as water dries up substantially as a film instead of as contracting droplets and due to the larger surface area for evaporation. The more uniform drying process further results in that dried up water stains from dirt or dissolved salts in the water are avoided or considerably reduced as they are more evenly distributed on the surface. Thereby an overall cleaner looking board or panel after cleaning are provided.

Furthermore, the photocatalytic nanoparticles have VOC reducing properties. Thereby the building panel reduces the level of indoor VOCs.

The barrier particles prevent the photocatalytic nanoparticles from make contact and react with the base coat, i.e. any underlying lacquer layer. If the photocatalytic nanoparticles react with the base coat or any other underlying lacquer layer, the base coat or any other underlying lacquer layer can be damaged by the photocatalytic activity of the nanoparticles. For example, the photocatalytic activity of the photocatalytic nanoparticles may degrade the base coat. The photocatalytic nanoparticles may impact properties of the base coat, such as changing the colour of the base coat.

A second aspect of the invention is a method of manufacturing a photocatalytic lacquered wood product comprising transparent photocatalytic nanoparticles, the method comprising the steps of:
  applying a base coat by lacquering an underlying wood product to obtain at least one overlaying lacquer;
  coating said overlying lacquer(s) with a barrier coating fluid, to obtain a transparent barrier layer;
  coating said transparent barrier layer with a photocatalytic coating fluid, preferably comprising $TiO_2$, to obtain a transparent photocatalytic layer; and
  curing said overlaying lacquer(s), barrier layer and/or photocatalytic layer.

The coating composition may be applied in one or more steps with optional step(s):
  curing or semi-curing said barrier layer and/or overlying lacquer prior coating with a photocatalytic coating fluid;
  drying said barrier coating fluid; and/or
  drying said photocatalytic coating fluid The coating is preferably performed by spraying.

The photocatalytic coating fluid may comprise photocatalytic nanoparticles, preferably comprising $TiO_2$. The concentration of said nanoparticles may be up to about 30 wt %, 20, wt %, 10 wt %, 5 wt % or 1 wt %.

The method may comprise a step between the coating step(s) and the curing step in which step(s) the excess solvent is evaporated/partly dried. By applying the barrier layer and/or photocatalytic nanoparticles in a wet surface the distribution of the particles is improved.

The barrier layer comprises preferably a silicium containing compound such as $SiO_2$, colloidal $SiO_2$, functional nanoscaled $SiO_2$, silicone resin, organofunctional silanes, and/or colloidal silicic acid silane and/or a combination of said compounds.

Preferably, the barrier coating fluid and/or the photocatalytic coating fluid composition comprises a solvent comprising water. It is also contemplated that a solvent other than water is used.

The photocatalytic coating composition may comprise photocatalytic nanoparticles and a solvent, said solvent being selected from water, ethylene glycol, butyl ether, aliphatic linear, branched or cyclic or mixed aromatic-aliphatic alcohols, such as methanol, ethanol, propanol, isopropanol, butanol, isobutanol, benzyl alcohol or methoxypropanol or combinations thereof.

A third aspect of the invention is a building panel according to the first aspect produced by the method according the second aspect.

In embodiments of any aspects of the present invention the concentration of said nanoparticles in said coating fluids may be up to about 30 wt %, 20, wt %, 10 wt %, 5 wt %, or 1 wt %.

In embodiments of any aspects of the present invention the solid content in said barrier coating fluid may be up to about 30 wt %, 20, wt %, 10 wt %, 5 wt %, or 1 wt %.

In embodiments of any aspects of the invention the thickness of said barrier layer may be up to about 1 µm, 0.800 µm, 0.600 µm, 0.400 µm, 0.200 µm, 0.100 µm or 0.05 µm.

In embodiments of any aspects of the present invention, the thickness of said photocatalytic layer may up to about 1 µm, 0.800 µm, 0.600 µm, 0.400 µm, 0.200 µm, 0.100 µm or 0.05 µm.

In embodiments of any aspects of the present invention, the amount of said barrier and/or photocatalytic coating fluid(s) may be up to about 15 ml/m2, 10 ml/m2, 5 ml/m2 or 1 ml/m2.

In embodiments of any aspects of the present invention, said barrier and/or photocatalytic coating fluid(s) may be waterborne coating fluids.

In embodiments of any aspects of the present invention, said barrier and/or photocatalytic coating fluid(s) may be applied by spraying and the size of the droplet may be up to about 200 µm, 150 µm, 100 µm, 50 µm, 25 µm or 10 µm.

In embodiments of any aspects of the present invention, the photocatalytic particles may be visible light sensitive and/or UV sensitive photocatalytic particles.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Figure 1:
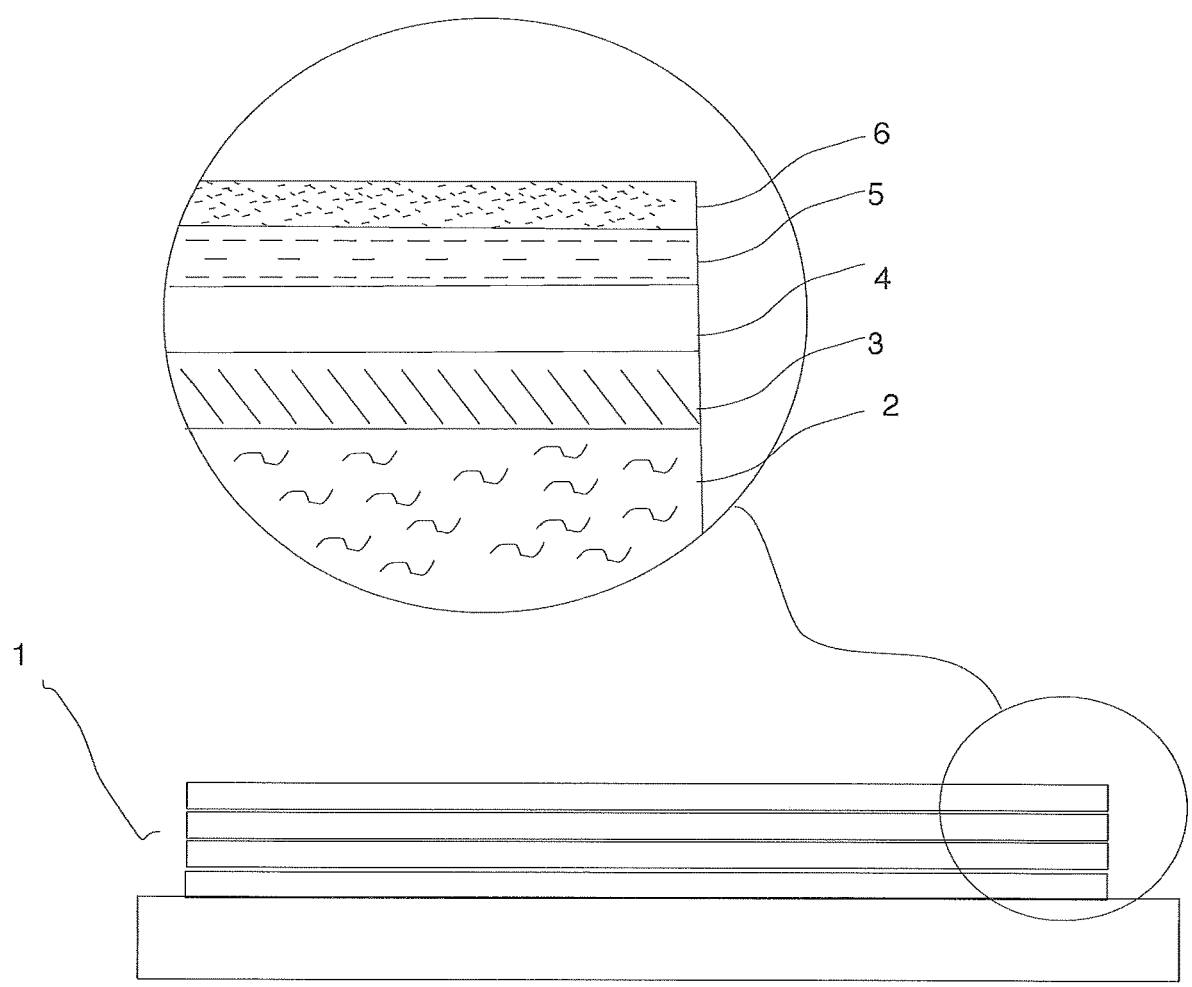
FIG. 1 Illustrates a wood product according to an embodiment of the invention.

In FIG. 1 an embodiment of a wood product 1, e.g. a photocatalytic lacquered board, is disclosed comprising a board 2 with a surface of wood, e.g. plywood, solid wood or a HDF/MDF board with a veneer or linoleum, a base coat 3 and a topcoat 5, 6. The topcoat comprises a barrier layer 5, comprising embedded barrier particles, and a second layer 6, comprising embedded photocatalytic nanoparticles. An area of mixed barrier and photocatalytic nanoparticles may be arranged between the barrier layer 5 and the second layer 6.

Figure 2:
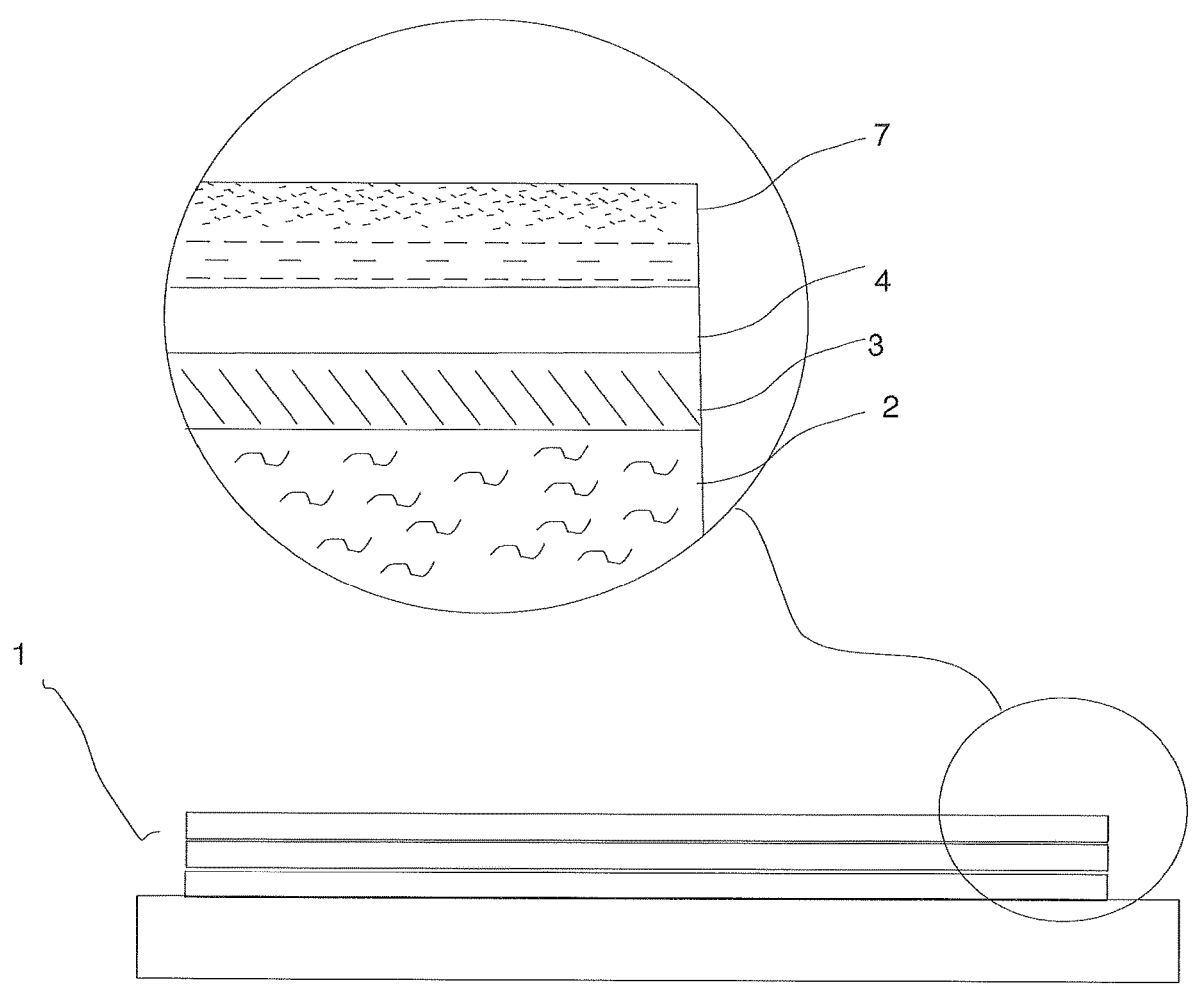
FIG. 2 Illustrates a wood product according to an embodiment of the invention.

In an alternative embodiment, which is shown in FIG. 2, the topcoat 7 comprises barrier particles and photocatalytic nanoparticles. The topcoat 7 comprises a lower part with high concentration of the barrier particles and an upper part with a high concentration of the nanoparticles and a mixed area there between comprising both barrier particles and nanoparticles.

In one embodiment there is a second coat 4 above the base coat and under the topcoat. The second coat may be an additional lacquer layer. Also the base coat and the topcoat may comprise more than one layer in all embodiments.

In all embodiments, the base coat 3 may be at least one lacquer layer. By lacquer layer is also meant any varnish layer. The base coat 3 may be transparent. The base coat may for example be a UV curable lacquer or an oxidation lacquer (drying). The base coat is not part of a paper layer, as in a paper laminate. For example, the base layer may be a separate layer, independently applied to a topmost surface of a board.

Furthermore, in all embodiments, the topcoat 5, 6, 7 may be transparent. The topcoat may be a water-based coating or a solvent based coating. In an embodiment wherein the topcoat comprises a barrier layer 5 and a second layer 6 comprising the photocatalytic nanoparticles, both the barrier layer 5 and the second layer 6 may be transparent. The barrier layer is not part of a paper layer, as in a wear resistant layer in a paper laminate. For example, the barrier layer is a separate layer, independently applied to a base coat.

In all embodiments, the barrier particles are preferably $SiO_2$, or a silicium containing compound such as $SiO_2$, colloidal $SiO_2$, functional nanoscaled $SiO_2$, silicone resin, organofunctional silanes, and/or colloidal silicic acid silane and/or a combination of said compounds. The barrier particles protect the base coat from being damaged or impacted by the photocatalytic activity of the photocatalytic nanoparticles. The barrier particles prevent the base coat from being degraded by the photocatalytic activity of the photocatalytic nanoparticles.

The photocatalytic nanoparticles may be transparent. The photocatalytic nanoparticles may have a size of less than 35 nanometres, preferably about 20 nanometres.

Figure 3:
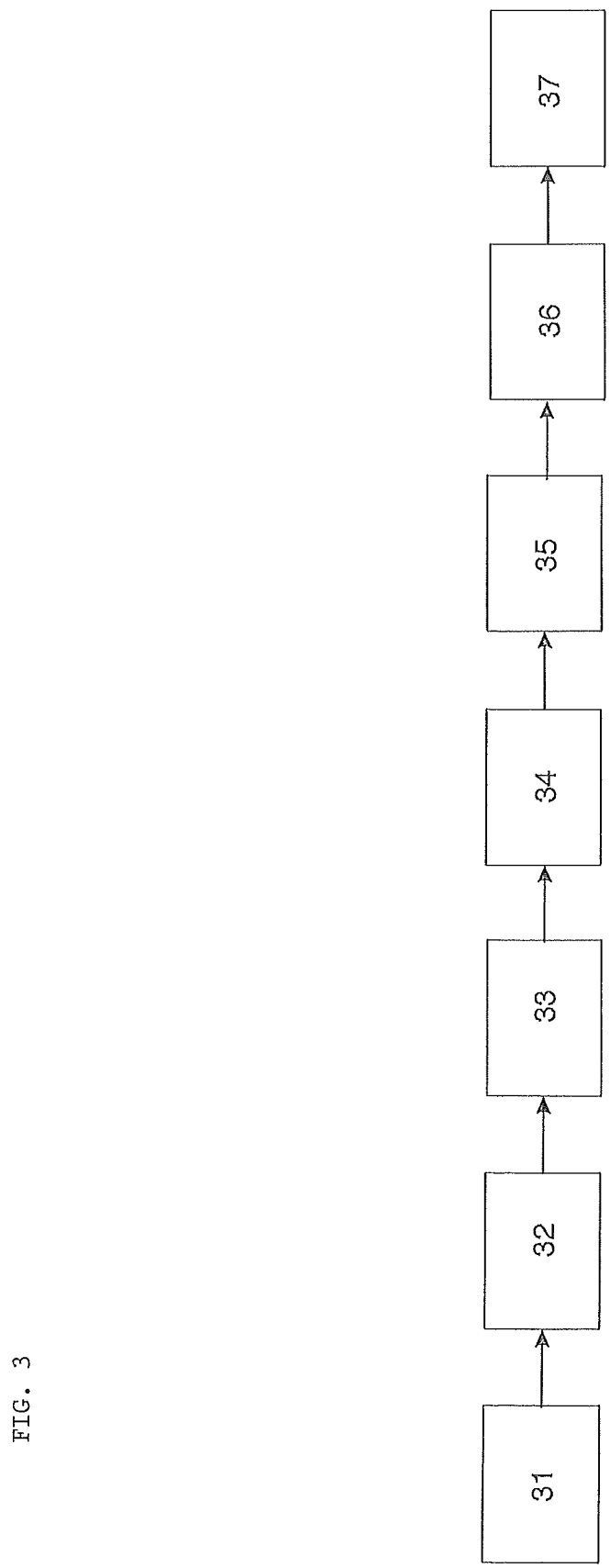
FIG. 3 Illustrates a method for producing a coated wood product.

FIG. 3 discloses a production line for manufacturing a photocatalytic lacquered wood product comprising transparent photocatalytic nanoparticles, the method comprising the steps of:

applying a base coat by lacquering on an underlying wood product to obtain at least one overlaying lacquer (step 31);

coating said overlaying lacquer(s) with a barrier coating fluid, preferably comprising a Si-containing compound, to obtain a transparent barrier layer (step 33);

coating said transparent barrier layer with a photocatalytic coating fluid, preferably comprising $TiO_2$, to obtain a transparent photocatalytic layer (step 35); and curing said overlaying lacquer(s), barrier layer and photocatalytic layer (step 37).

The production line may comprise one or more of the additional step(s):

Curing or semi-curing said overlaying lacquer, prior to coating with a barrier coating fluid (step 32);

drying said transparent barrier layer composition (step 34); and/or drying said photocatalytic coating composition (step 36).

The coating is preferably performed by spraying.

Any step may be multiplied such as applying several layers of barrier/photocatalytic to obtain multi-layered products with longer service life.

The base coat may comprise more than one overlaying lacquer, for example a base lacquer, a middle lacquer and a top lacquer. The overlaying lacquer(s) may be for example be a UV curable lacquer or an oxidation lacquer (drying). The overlaying lacquer(s) may be transparent.

Example 1

Applying a Photocatalytic Top Layer Composition by Spray Application on Wet Top Lacquer—Air Mixed Nozzles A 8×30 cm wooden floor board was lacquered with a base lacquer, a middle lacquer and a top lacquer forming overlying lacquers. The wet top lacquered wooden floor board entered the application of the photocatalytic composition coating with a velocity of 30 m/min. The wet lacquered wooden floor board was coated according to:

1) 5 ml/m2 of a 5.6 wt % $SiO_2$ in water fluid was applied.
2) IR drying of the excess amount of water by a 3 kW IR lamp and by applying heated dry air.
3) 5 ml/m2 of a 5.0 wt % $TiO_2$ in water fluid was applied.
4) IR drying of the excess amount of water by a 3 kW IR lamp and by applying heated dry air.
5) Curing of the wooden composite sample with UV light.

Ad 1) The barrier layer coating fluid (1) used was a stable nanoparticle dispersion based on a 5.6 wt % water based dispersion of colloidal $SiO_2$ surface modified with epoxy silane mixed with 0.5 wt % BYK 348 or similar as wetting agent. The average particle size was 7 nm. The barrier layer coating fluid was applied with air atomized nozzles (5 mL/m² corresponding to 34 ml/min) given a droplet size of <50 micron meter average droplet size.

Ad 2) The barrier layer coated sample was IR dried with a 3 kW IR heating unit theoretically capable of evaporating 3-5 g/m2 of water.

Ad 3) The photocatalytic coating fluid (3) used was a stable $TiO_2$ nanoparticle dispersion based on a 5.0 wt % water based dispersion of doped $TiO_2$ capable of absorbing visible light (380-500 nm) mixed with 0.5 wt % BYK 348 as wetting agent. The average particle size was 18 nm. The photocatalytic coating fluid was applied with air atomized nozzles (5 mL/m² corresponding to 34 ml/min) given a droplet size of <50 micron meter average droplet size.

Ad 4) The photocatalytic coated sample was IR dried with a 3 kW IR heating unit theoretically capable of evaporating 3-5 g/m2 of water.

Ad 5) The photocatalytic lacquered wooden sample was UV cured.

Example 1a

Applying a Photocatalytic Top Layer Composition by Spray Application on Wet Top Lacquer—Rotation Atomizer Same as Example 1; however, the application of barrier layer (1) and the application of TiO2 (3) is made with a high speed rotating atomizer nozzle yielding a very fine mist of droplets making a very uniform coating.

Example 2

Photocatalytic Activity by EtOH Degradation

The photocatalytic activity of a sample prepared according to Example 1 was evaluated against degradation of EtOH by monitoring the $CO_2$ release. The $CO_2$ release test resulting from degradation of EtOH is a fast model experiment which is used to estimate the air quality improvement. The samples are placed in a 6 l sealed box with a 500 ppm ethanol atmosphere inside and the $CO_2$ concentration is followed over time. The EtOH is degraded to $CO_2$ due to the photocatalytic particles in the lacquered wood. The sample was irradiated with a light source yielding UV=1.250 mW/cm².

TABLE 1

Activity of background substrated lacquered sample.

|  | Photocatalytic Lacquer Sample |
| --- | --- |
| Rate [ppm CO2/hr] | 25 |

Example 3

Improved Washability by Contact Angle Measurement

The contact angle with water was measured for a reference (no light) and for a photocatalytic coated sample as described in Example 1 applying the PGX from FIBRO System AB (see Table 2). These measurements were repeated 5 times at random positions on the board. Upon light exposure (0.68 W/m2/nm at 340 nm) the coated part of the lacquered board had become hydrophilic, as evidenced by the low contact angle. Importantly the photocatalytic topcoating was transparent making it invisible on the lacquered board. Furthermore, no chalking or other damaging effects of the lacquer were seen.

TABLE 2

Contact angle measurements.

|  | Photocatalytic Lacquer | Reference |
| --- | --- | --- |
| 0 hr | 81.0 ± 3.0 | 79.8 ± 3.2 |
| 12 hr | 65.2 ± 5.4 | 81.7 ± 0.8 |

TABLE 2-continued

Contact angle measurements.

|  | Photocatalytic Lacquer | Reference |
| --- | --- | --- |
| 61 hr | 45.3 ± 3.6 | 76.7 ± 1.1 |
| 95 hr | 48.5 ± 3.1 | 73.6 ± 1.0 |

Example 4

Applying a Photocatalytic Top Layer Composition by Spray Application on Wet Top Lacquer—Air Mixed Nozzles A wooden floor board was lacquered with a base lacquer, a middle lacquer and a top UV curable lacquer forming overlying lacquers. The wet top lacquered wooden floor board entered the application of the photocatalytic composition coating with a velocity of 10 m/min. The wet lacquered wooden floor board was coated according to:

1) 5 ml/m2 of an appr. 3.5 wt % aqueous solution of colloidal silicic acid silane fluid was applied.
2) IR drying of the excess amount of water by 3 kW IR lamp and by applying forced heated dry air.
3) 5 ml/m2 of a 1.0 wt % TiO2 in water fluid was applied.
4) IR drying of the excess amount of water by 3 kW IR lamp and by applying forced heated dry air.
5) Curing of the wooden composite sample with UV light.

Ad 1) The barrier layer coating fluid (1) used was an appr. 3.5 wt % aqueous solution of colloidal silicic acid silane fluid mixed with 0.5 wt % wetting agent. The barrier layer coating fluid was applied with air atomized nozzles (5 mL/m² corresponding to 12.5 ml/min) given a droplet size of <50 micron meter average droplet size.

Ad 2) The barrier layer coated sample was IR dried with a 3 kW IR heating unit capable of evaporating 5 g/m2 of water.

Ad 3) The photocatalytic coating fluid (3) used was a stable TiO2 nanoparticle dispersion based on a 1.0 wt % water based dispersion of doped TiO2 capable of absorbing visible light (380-500 nm) mixed with 0.5 wt % wetting agent. The average particle size was 18 nm. The photocatalytic coating fluid was applied with air atomized nozzles (5 mL/m² corresponding to 12.5 ml/min) given a droplet size of <50 micron meter average droplet size.

Ad 4) The photocatalytic coated sample was IR dried with a 3 kW IR heating unit capable of evaporating 3-5 g/m2 of water.

Ad 5) The photocatalytic lacquered wooden sample was UV cured.

Example 5

Visual Appearance and Gloss Level

The gloss level for a reference (no barrier layer and no photocatalytic particles) and for a photocatalytic coated sample as described in Example 4 were measured at an angle of 60°. These measurements were repeated 3 times at random positions on the board. Visual inspection of the photocatalytic coating showed a transparent coating on the lacquered board.

TABLE 3

| Gloss measurements. | |
|---|---|
| Photocatalytic Board | Reference Board |
| 42.7 ± 1.1 | 38.8 ± 0.4 |

The invention claimed is:

1. A method of manufacturing a photocatalytic lacquered wood product, wherein the method comprises:
    lacquering an underlying wood product to obtain a base coat comprising at least one lacquer layer;
    coating said base coat with a barrier coating fluid comprising barrier particles, to obtain a transparent barrier layer;
    spraying said transparent barrier layer with a photocatalytic coating fluid comprising photocatalytic nanoparticles to obtain a transparent photocatalytic layer disposed on said transparent barrier layer, said photocatalytic nanoparticles being embedded and homogenously distributed in said transparent photocatalytic layer; and then
    curing said wood product such that at least the base coat is cured.

2. The method as claimed in claim 1, wherein the method comprises semi-curing said base coat, prior to coating with the barrier coating fluid.

3. The method as claimed in claim 1, wherein the photocatalytic nanoparticles comprise $TiO_2$.

4. The method as claimed in claim 1, wherein a thickness of said barrier layer is up to about 1 μm.

5. The method as claimed in claim 1, wherein a thickness of said photocatalytic layer is up to about 1 μm.

6. A building panel produced according to the method in claim 1.

7. The method as claimed in claim 1, further comprising curing the barrier layer.

8. The method as claimed in claim 1, further comprising curing the photocatalytic layer.

9. The method as claimed in claim 1, further comprising curing the barrier layer and the photocatalytic layer.

10. The method as claimed in claim 1, wherein the base coat comprises a base lacquer, a middle lacquer and a top lacquer.

11. The method as claimed in claim 1, wherein the barrier particles in the transparent barrier layer prevent the photocatalytic nanoparticles from reacting with the base coat.

12. The method as claimed in claim 1, wherein a size of a droplet of the photocatalytic coating fluids is up to about 200 μm.

13. The method as claimed in claim 1, wherein the method comprises drying said barrier coating fluid, prior to spraying with said photocatalytic coating fluid.

14. The method as claimed in claim 13, wherein the barrier coating fluid is a waterborne fluid.

15. The method as claimed in claim 13, wherein the barrier coating fluid is applied by spraying.

16. The method as claimed in claim 15, wherein a size of a droplet of said barrier coating fluid is up to about 200 μm.

17. The method as claimed in claim 1, further comprising drying said photocatalytic coating fluid after spraying said transparent barrier layer with said photocatalytic coating fluid and before said curing.

18. The method as claimed in claim 1, wherein the photocatalytic coating fluid comprises the photocatalytic nanoparticles in a concentration of up to about 30 wt %.

19. The method as claimed in claim 17, wherein an amount of at least one of said barrier or photocatalytic coating fluid(s) is up to about 15 ml/m$^2$.

20. The method as claimed in claim 17, wherein the photocatalytic coating fluid is a waterborne fluid.

21. The method as claimed in claim 1, wherein the barrier particles comprise a silicon containing compound.

22. The method as claimed in claim 21, wherein the silicon containing compound is selected from $SiO_2$, colloidal $SiO_2$, functional nanoscaled $SiO_2$, silicone resin, organofunctional silanes, and/or colloidal silicic acid silane and/or a combination of said compounds.

\* \* \* \* \*